United States Patent [19]

Rhoads

[11] Patent Number: 4,486,550

[45] Date of Patent: Dec. 4, 1984

[54] STYRENIC FOAM AND PROCESS THEREFOR

[75] Inventor: Timothy W. Rhoads, Newark, Ohio

[73] Assignee: The Dow Chemical Company, Midland, Mich.

[21] Appl. No.: 603,477

[22] Filed: Apr. 24, 1984

[51] Int. Cl.$^3$ .............................. C08J 9/12; C08J 9/14
[52] U.S. Cl. ........................................ 521/79; 264/53; 264/DIG. 5; 521/88; 521/910
[58] Field of Search ........................... 521/79, 910, 88; 264/53, DIG. 5

[56] References Cited

U.S. PATENT DOCUMENTS 4,436,679  3/1984  Winstead ................................ 264/53
4,455,272  6/1984  Schubert et al. ....................... 264/53

Primary Examiner—Morton Foelak
Attorney, Agent, or Firm—R. B. Ingraham

[57] ABSTRACT

Styrenic foams are prepared with water as a blowing agent component and polyhydric alcohol as a corrosion inhibitor.

3 Claims, No Drawings

STYRENIC FOAM AND PROCESS THEREFOR

Styrene polymer foam is a highly desirable article of commerce and employed in a wide variety of applications. A particularly important application of such foam is in the field of thermal insulation. A very desirable variety of styrenic polymer foam is disclosed in U.S. patent application Ser. No. 569,421, filed on Jan. 9, 1984 and is also disclosed in the U.S. patent applcation Ser. No. 362,954, filed on Mar. 29, 1982. Such foam exhibits phenomenon referred to as secondary foaming, wherein the normal cells of a styrenic polymer foam are formed but in addition to the normal cells there are cells formed in the cell walls and the cell structures. Styrenic polymer foams prepared in accordance with the hereinbefore stated patent applications, the teachings of which are herewith incorporated by reference thereto, provide very desirable thermal insulation and have the significant advantage of being prepared employing as a blowing agent a fluorocarbon and water, eliminating the need for methyl chloride in the blowing agent composition and subsequently requiring an extended period of aging for the foam to reach a stable dimension. Such dimensional stability is particularly important when the foam is employed in construction and is laminated to a cementitious layer. Styrenic polymer foams in general are highly flammable, and for many applications it is desirable to have a fire retardant additive to reduce the rate of flame propagation. Generally such fire retardants are organic compounds having a relatively high content of bromine. In processing such fire retardant compositions wherein water is utilized as a component of the blowing agent, substantial and significant difficulty has been encountered. The water is believed to promote decomposition of the brominated organic compound and provide an acid content within the polymer melt that corrodes the equipment generally employed in the extrusion of styrenic foams.

It would be desirable if there were available a foam forming composition wherein water is employed as a component in the blowing agent system which would not significantly corrode the foam products and equipment.

It would also be desirable if there were available an improved process for the preparation of styrenic polymer foams which resulted in significantly reduced corrosion of the processing equipment.

It would also be desirable if there were available an improved process for the preparation of styrenic foams employing a relatively nonvolatile corrosion reducing element.

These benefits and other advantages in accordance with the present invention are achieved in a process for the preparation of an alkenyl aromatic thermoplastic resinous elongate foam body having a machine direction and a transverse direction, the body defining a plurality of closed non-interconnecting gas containing primary cells therein the steps of the method consisting of heat plastifying an alkenyl aromatic synthetic resinous material, adding to the heat plastifying synthetic resinous material a volatile fluid foaming agent to provide a foaming agent resinous polymer mixture under a pressure sufficiently high that foaming is prevented, the foaming agent comprising a mixture of fluorocarbon and water, mixing the fluid foaming agent with the plastified resin to form an expandable resinous mixture, reducing the temperature of the mixture to a temperature such that when pressure is removed therefrom a foam of desirable quality is obtained, reducing the pressure of the mixture to thereby cause the mixture to form a foam of desired quality, the improvement which comprises incorporating within such expandable mixture corrosion reducing amount of a polyhydric alcohol wherein the hydroxyl groups of the polyhydric alcohol are attached to nonadjacent carbon atoms.

Also contemplated within the scope of the present invention is a synthetic resinous thermoplastic foam prepared in accordance with the hereinbefore described method wherein an alkenyl aromatic thermoplastic synthetic resinous elongate foam body having a machine direction and a transverse direction, the body defining a plurality of closed noninterconnecting gas-containing primary cells therein, the primary cells being formed of a plurality of walls and struts, the struts being at the juncture of adjacent primary cell walls with the further limitation that at least a portion of the walls and struts have secondary cells formed therein.

Extruded foams and their manufacture are discussed at great length in U.S. Pat. Nos. 2,409,910; 2,515,250; 2,699,751; 2,848,428; 2,928,130; 3,121,130; 3,121,911; 3,770,688; 3,815,674; 3,960,792; 3,966,381; 4,085,073; and 4,146,563, the teachings of which are herein incorporated with reference thereto.

Fire retardant mixtures of alkenyl aromatic materials are also well known in the art and are set forth in U.S. Pat. Nos. 3,058,928; 3,058,929; 3,207,724; 3,210,326; 3,267,070; 3,297,658; 3,457,204; 3,472,799; 3,640,914; 4,089,912; 4,173,561; 4,218,511; 4,272,583; 4,274,998; 4,277,567; 4,280,952; 4,293,656; 4,301,058; and 4,343,854, the teaching of which are hereby incorporated by reference thereto.

A wide variety of materials are useful in the practice of the present invention and include pentabromomonochlorocyclohexane, hexabromocychlorododecane and the like. Many polyhydric materials may be utilized in the practice of the present invention. Such polyhydric materials have hydroxyl groups attached to nonadjacent carbon atoms. A particularly desirable material meeting this requirement is pentaerythritol.

Advantageously, the foam has an average primary cell size of from about 0.05 to 3 millimeters and preferably from about 0.1 to 0.9 millimeters, the foam body being of a generally uniform primary cellular structure and being without discontinuities, the body being without substantial variation in average primary cell size when primary cell size is measured by averaging primary cell diameter across the minimum cross-sectional dimension of the body (i.e., such as by ASTM Method D2842-69), the elongate body having a cross-sectional area of at least 8 square inches and having a minimum cross-sectional dimension of at least 0.25 inch, the foam body having a water vapor permeability not greater than 1.8 perm inches as measured by ASTM Method C355-64 Procedures for Desiccant method, a density of from about 1 to about 5 pounds per cubic foot. The primary cells contain a fluorocarbon blowing agent which has a permeability through the alkenyl aromatic resinous polymer of not greater than 0.5 times the permeability of nitrogen through the body and having a thermal conductivity of $0.07 \pm 20$ percent British thermal units-inch per hour per square foot per degree Fahrenheit.

By the term "alkenyl arromatic synthetic resin" is meant a solid polymer of one or more polymerizable alkenyl aromatic compounds. The polymer or copolymer comprises in chemically combined form, at least 94 percent by weight of at least one alkenyl aromatic compound having the general formula

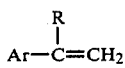

wherein Ar represents an aromatic hydrocarbon radical, or an aromatic halo-hydrocarbon radical of the benzene series, and R is hydrogen or the methyl radical. Examples of such alkenyl aromatic resins are the solid homopolymer of styrene, a-methylstyrene, o-methylstyrene, m-methylstyrene, p-methylstyrene, ar-ethylstyrene, ar-vinylxylene, ar-chlorostyrene or ar-bromostyrene; the solid compolymers of two or more of such alkenyl aromatic compounds with minor amounts of other readily polymerizable olefinic compounds such as methylmethacrylate, acrylonitrile, maleic anhydride, citraconic anhydride, itaconic anhydride, acrylic acid, rubber reinforced (either natural or synthetic) styrene polymers, etc.

Blowing agents useful in the practice of the present invention of commercial purity are generally satisfactory. For the practice of the present invention, it is desirable that the blowing agent comprise from about one-half to 5 parts by weight per hundred parts by weight of the resin of water and 3 to 10 parts by weight per hundred parts by weight based on resin of a volatile fluid fluorocarbon, boiling at 100 degrees centrigrade or less. Such fluorocarbons include perfluoromethane, chlorotrifluoromethane, dichlorodifluoromethane, trichlorofluoromethane, carbon tetrachloride, perfluoroethane, chloropentafluoroethane, dichlorotetrafluoroethane, trichlorotrifluoroethane, perfluoropropane, chloroheptafluoropropane, dichlorohexafluoropropane, perfluorobutane, chlorononafluorobutane and perfluorocyclobutane.

Generally, the preparation of alkenyl aromatic resinous polymer foams in accordance with the present invention is most conveniently done in a manner generally as shown and described in U.S. Pat. No. 2,669,751, wherein the volatile fluid foaming agent is injected into a heat-plastified polymer stream within an extruder. From the extruder the heat-plastified gel is passed into a mixer, the mixer being a rotary mixer wherein a studded rotor is enclosed within a housing which has a studded internal surface which intermeshes with the studs on the rotor. The heat-plastified gel from the extruder is fed into the inlet end of the mixer and discharged from the outlet end, the flow being in a generally axial direction. From the mixer, the gel passes through coolers such as are described in U.S. Pat. No. 2,669,751 and from the coolers to a die which extrudes a generally rectangular board. A generally similar extrusion system and a preferred extrusion system is shown in U.S. Pat. No. 3,966,381.

In the preparation of foams in accordance with the present invention, it is often desirable to add a nucleating agent to reduce the primary cell size. Talc, calcium silicate, indigo, and the like are suitable agents which reduce primary cell size.

Various other additives may be utilized with the fire retardant chemical such as stabilizers, pigments, dyes and the like.

In the preparation of foams in accordance with the present invention, the blowing agent may be added to the resin in any convenient manner. Generally the fluorocarbon and the water are pumped into heat plastified alkenyl aromatic resin and admixed therewith prior to extrusion to form foam. The fluorocarbon and water may be admixed, that is, one emulsified within the other and pumped as a combination stream into the heat plastified resin, or they may be supplied as separate streams. Adequate mixing of the blowing agents into the heat plastified resin is required in order to obtain a product of desirable uniformity. Such mixing may be accomplished by a variety of means including rotary mixers such as extruders, so-called static mixers or interfacial surface generators, such as are utilized in U.S. Pat. Nos. 3,751,377 and 3,817,669.

Advantageously a corrosion reducing agent is admixed with the styrenic or alkenyl aromatic resinous material prior to heat plastification thereof. Such mixing may be accomplished by any convenient means such as dry blending prior to introduction of the resin into the hopper of the extrusion extruder or it may be simultaneously fed to the extruder hopper as the alkenyl aromatic resin is added thereto. Advantageously, the corrosion reducing polyhydric alcohol is added in a proportion of from about 0.1 to 5 parts by weight per hundred parts by weight of the resin and beneficially from 0.2 to 2.05 parts by weight per hundred parts of the resin. Generally, the flame inhibitor of fire retardant material is generally added at a level of from about 0.5 to about 5 parts by weight per hundred parts of the resin. Extended operation employing corrosion inhibitors in accordance with the invention results in substantially less corrosion of the equipment than when operated without in the preparation of polystyrene foam. Pentaerythritol is a particularly desirable corrosion inhibitor.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A process for the preparation of an alkenyl aromatic thermoplastic resinous elongate foam body having a machine direction and a transverse direction, the body defining a plurality of closed non-interconnecting gas containing primary cells therein the steps of the method consisting of heat plastifying an alkenyl aromatic synthetic resinous material, adding to the heat plastifying synthetic resinous material a volatile fluid foaming agent to provide a foaming agent resinous polymer mixture under a pressure sufficiently high that foaming is prevented, the foaming agent comprising a mixture of fluorocarbon and water, mixing the fluid foaming agent with the plastified resin to form an expandable resinous mixture, reducing the temperature of the mixture to a temperature such that when pressure is removed therefrom a foam of desirable quality is obtained, reducing the pressure of the mixture to thereby cause the mixture to form a foam of desired quality, the improvement which comprises incorporating within such expandable mixture corrosion reducing amount of a polyhydric alcohol wherein the hydroxyl groups of the polyhydric alcohol are attached to nonadjacent carbon atoms.

2. The process of claim 1 wherein the alkenyl aromatic thermoplastic body is a styrenic polymer.

3. The process of claim 1 wherein the foam is polystyrene foam.

* * * * *